United States Patent
Fang et al.

(10) Patent No.: US 12,437,350 B2
(45) Date of Patent: Oct. 7, 2025

(54) CONTROL METHOD FOR HOME ENERGY SYSTEM, SYSTEM, ENERGY MANAGEMENT DEVICE, AND STORAGE MEDIUM

(71) Applicant: SHENZHEN HELLO TECH ENERGY CO., LTD, Guangdong (CN)

(72) Inventors: Jian Fang, Guangdong (CN); Shengxiang Kong, Guangdong (CN)

(73) Assignee: SHENZHEN HELLO TECH ENERGY CO., LTD, Guangdong (CN)

( * ) Notice: Subject to any disclaimer, the term of this patent is extended or adjusted under 35 U.S.C. 154(b) by 100 days.

(21) Appl. No.: 18/423,324

(22) Filed: Jan. 26, 2024

(65) Prior Publication Data
US 2025/0045845 A1    Feb. 6, 2025

Related U.S. Application Data

(63) Continuation of application No. PCT/CN2023/126402, filed on Oct. 25, 2023.

(30) Foreign Application Priority Data

Aug. 2, 2023   (CN) .......................... 202310972632.3
Aug. 3, 2023   (CN) .......................... 202310979971.4

(51) Int. Cl.
G06Q 50/06   (2024.01)
H02J 3/00    (2006.01)
H02J 3/32    (2006.01)

(52) U.S. Cl.
CPC ............ *G06Q 50/06* (2013.01); *H02J 3/0075* (2020.01); *H02J 3/32* (2013.01)

(58) Field of Classification Search
CPC .......... G06Q 50/06; H02J 3/0075; H02J 3/32; H02J 3/381

(Continued)

(56) References Cited

U.S. PATENT DOCUMENTS

2012/0226367 A1   9/2012  Tournier et al.
2016/0094034 A1*  3/2016  Divan ................ H02J 3/381
                                            323/208

(Continued)

FOREIGN PATENT DOCUMENTS

CN    104281977 A    1/2015
CN    106058936 A    10/2016

(Continued)

OTHER PUBLICATIONS

International Search Report dated Apr. 15, 2024 in International Application No. PCT/CN2023/126402. English translation attached.

(Continued)

*Primary Examiner* — Richard Tan

(57) ABSTRACT

Provided are a control method for a home energy system (100), an energy system, an energy management device, and a computer-readable storage medium. The control method includes: when the home energy system (100) is in a grid-connected state and a non-time-shifting power generation device is in a power-supply state, obtaining net power of the home energy system (100) during each power consumption time period of a current day, and when the net power is smaller than zero, controlling, based on an electricity price of the public grid (20), the home energy system (100) to be power by an energy storage device (12) or by the public grid (20); and when the net power is greater than zero, controlling the power generation device to output electric energy to the energy storage device (12) or the public power grid (20).

20 Claims, 12 Drawing Sheets

(58) Field of Classification Search
USPC .......................................................... 307/32
See application file for complete search history.

(56) References Cited

U.S. PATENT DOCUMENTS

| | | | |
|---|---|---|---|
| 2017/0168516 A1* | 6/2017 | King | H02J 3/32 |
| 2018/0262122 A1 | 9/2018 | Okazaki et al. | |
| 2019/0140477 A1 | 5/2019 | Yang et al. | |

FOREIGN PATENT DOCUMENTS

| | | |
|---|---|---|
| CN | 106786555 A | 5/2017 |
| CN | 107240917 A | 10/2017 |
| CN | 109193803 A | 1/2019 |
| CN | 109767087 A | 5/2019 |
| CN | 110112784 A | 8/2019 |
| CN | 111525624 A | 8/2020 |
| CN | 211880096 U | 11/2020 |
| CN | 112332444 A | 2/2021 |
| CN | 113555887 A | 10/2021 |
| CN | 114123430 A | 3/2022 |
| CN | 114301097 A | 4/2022 |
| CN | 115173452 A | 10/2022 |
| CN | 115411833 A | 11/2022 |
| CN | 115800321 A | 3/2023 |
| CN | 218733282 U | 3/2023 |
| CN | 116316767 A | 6/2023 |
| CN | 116365507 A | 6/2023 |
| JP | H11178237 A | 7/1999 |
| JP | 2004194495 A | 7/2004 |
| JP | 2005185070 A | 7/2005 |
| JP | 2010259201 A | 11/2010 |
| JP | 2012152093 A | 8/2012 |
| JP | 2012228043 A | 11/2012 |
| JP | 2016163422 A | 9/2016 |
| JP | 2020150740 A | 9/2020 |
| JP | 2021083267 A | 5/2021 |
| JP | 2021121517 A | 8/2021 |
| JP | 2021191199 A | 12/2021 |
| WO | 2016158777 A1 | 10/2016 |
| WO | 2020026874 A1 | 2/2020 |
| WO | 2022024517 A1 | 2/2022 |

OTHER PUBLICATIONS

Written Opinion of the ISA dated Apr. 15, 2024 in International Application No. PCT/CN2023/126402. English translation attached.
International Search Report dated Nov. 17, 2023 in International Application No. PCT/CN2023/116625. English translation attached.
Written Opinion dated Nov. 17, 2023 in International Application No. PCT/CN2023/116625. English translation attached.
International Search Report dated Apr. 15, 2024 in International Application No. PCT/CN2023/126405. English translation attached.
Written Opinion dated Apr. 15, 2024 in International Application No. PCT/CN2023/126405. English translation attached.
Advisory Action dated Aug. 26, 2024 received in corresponding patent family U.S. Appl. No. 18/423,318.
Final Rejection dated Jun. 18, 2024 received in corresponding patent family U.S. Appl. No. 18/423,318.
Non-Final Rejection dated Mar. 26, 2024 received in corresponding patent family U.S. Appl. No. 18/423,318.
Notice of Reasons for Refusal dated Jul. 29, 2025 received in corresponding patent family application No. JP2024505075. English translation attached.
Notice of Reasons for Refusal dated Jul. 29, 2025 received in corresponding patent family application No. JP2024505084. English translation attached.
Notice of Reasons for Refusal dated Jul. 29, 2025 received in corresponding patent family application No. JP2024505091. English translation attached.

* cited by examiner

CONTROL METHOD FOR HOME ENERGY SYSTEM, SYSTEM, ENERGY MANAGEMENT DEVICE, AND STORAGE MEDIUM

CROSS-REFERENCE TO RELATED APPLICATIONS

The present application is a continuation of International Application No. PCT/CN2023/126402 filed on Oct. 25, 2023, which claims priority to and benefits of Chinese Patent Application No. 202310972632.3, filed with China National Intellectual Property Administration on Aug. 2, 2023, and Chinese Patent Application No. 202310979971.4, filed with China National Intellectual Property Administration on Aug. 3, 2023, the entire disclosure of which are incorporated herein by reference.

FIELD

The present disclosure relates to the field of home energy technologies, and more particularly, to a control method for a home energy system, a system, an energy management device, and a storage medium.

BACKGROUND

Current home energy management relies on a smart power distribution box, which controls each circuit load on and off, and can remotely control home loads and power management, thereby realizing the home energy system management.

In the related technology, the home energy management can only control the switching of the loads and power generation device, but lacks comprehensive control of power supply of the power generation device and public power grids as well as power consumption of the loads, which leads to insufficiently detailed energy system management.

SUMMARY

The present disclosure provides a control method for a home energy system, a system, an energy management device, and a storage medium, aiming to solve at least one of the technical problems described above.

According to embodiments of the present disclosure, there is provided a control method for a home energy system. The home energy system includes a power distribution device connected to a plurality of loads, a non-time-shifting power generation device, and an energy storage device. The control method for the home energy system includes: when the home energy system is in a grid-connected state and the non-time-shifting power generation device is in a power-supply state, obtaining consumed electric power of the plurality of loads and generated electric power of the non-time-shifting power generation device during each electricity consumption time period of a current day; when net power of the home energy system during each electricity consumption time period of the current day is greater than zero, controlling, based on an electricity price of a public power grid during each electricity consumption time period of the current day, the home energy system to be powered by the energy storage device or powered by the public power grid to enable an electricity bill to meet a predetermined condition, the net power of the home energy system during each electricity consumption time period of the current day being a difference between the power generation power and the electric power; and when the net power of the home energy system during each electricity consumption time period of the current day is smaller than zero, controlling, based on the electricity price of the public power grid during each electricity consumption time period of the current day, the non-time-shifting power generation device to output electric energy to the energy storage device or the public power grid to enable the electricity bill to meet the predetermined condition.

The above control method for the home energy system helps a user to fine-tune control of the home energy system by predicting the net power of the home energy system and controlling power supply and consumption of the power generation device, the load and the energy storage device that are connected to the home energy system in combination with the electricity price of the public power grid.

According to embodiments of the present disclosure, there is provided a home energy system. The home energy system includes an energy management device, an energy storage device, a power distribution device, and a non-time-shifting power generation device. The energy management device is electrically connected to the power distribution device, the non-time-shifting power generation device, and the energy storage device, and the power distribution device is connected to a plurality of loads. The energy management device is configured to implement the control method for the home energy system as described in any one of the above embodiments.

According to embodiments of the present disclosure, there is provided an energy management device. The energy management device includes: a first processor; and a first memory storing a computer program. The computer program, when executed by the first processor, implements the steps of the control method for the home energy system as described in any one of the above embodiments.

According to embodiments of the present disclosure, there is provided a computer-readable storage medium. The computer-readable storage medium has a computer program stored thereon. The computer program, when executed by a first processor, implements the steps of the control method for the home energy system as described in any one of the above embodiments.

The home energy system, the energy management device, the power distribution device, and the computer-readable storage medium as above described help the user to fine-tune the control of the home energy system by predicting the net power of the home energy system and controlling the power supply and consumption of the power generation device, the load and the energy storage device that are connected to the home energy system in combination with the electricity price of the public power grid.

Additional aspects and advantages of the embodiments of present disclosure will be provided at least in part in the following description, or will become apparent in part from the following description, or can be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings.

Figure 1:
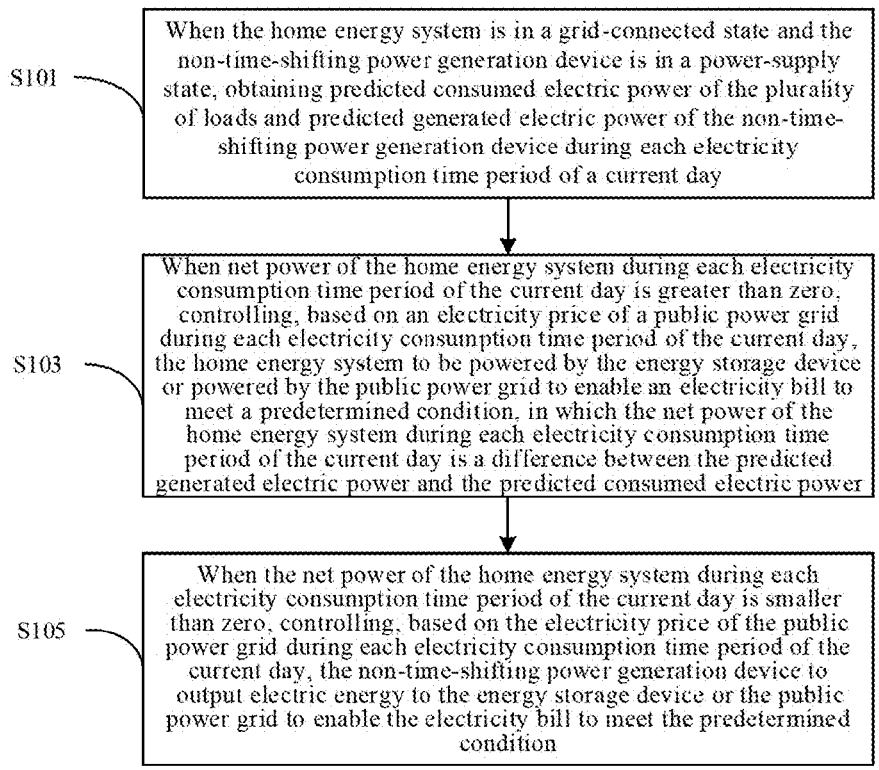
FIG. 1 is a flowchart of a control method for a home energy system according to an embodiment of the present disclosure.

REFERENCE NUMERALS home energy system 100, energy management device 10, energy storage device 12, power distribution device 14, power generation device 16, load 18, public power grid 20, photovoltaic power generation module 22, wind power generation module 24, fuel power generation module 26, first processor 28, first memory 30, second processor 32, second memory 34, switch 36, power supply circuit 38, and controller 40.

DETAILED DESCRIPTION

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain rather than limit the present disclosure.

The disclosure below provides a number of different implementations or examples used to realize different structures of the embodiments of the present disclosure. In order to simplify the disclosure of the embodiments of the present disclosure, components and settings of particular examples are described below, which are only examples and are not intended to limit the present disclosure. The embodiments of the present disclosure may repeat reference numerals and/or reference letters in different examples, and such repetition is for purposes of simplicity and clarity, and is not in itself indicative of a relationship between the various embodiments and/or settings that are discussed. In addition, the embodiments of the present disclosure provide examples of various specific processes and materials, but those of ordinary skill in the art may realize application of other processes and/or use of other materials.

Figure 2:
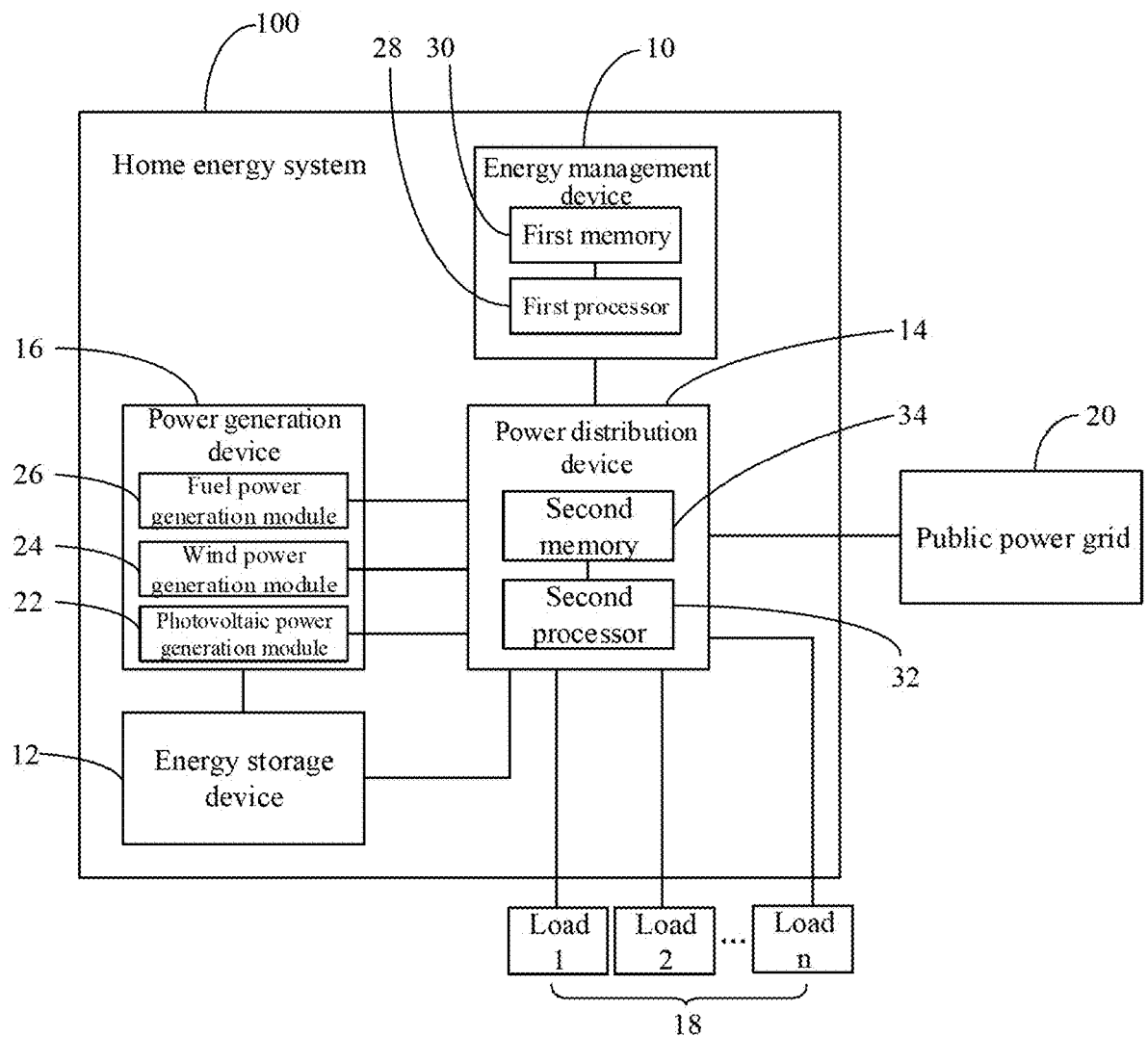
FIG. 2 is a schematic diagram of a module of a home energy system according to an embodiment of the present disclosure.
Figure 3:
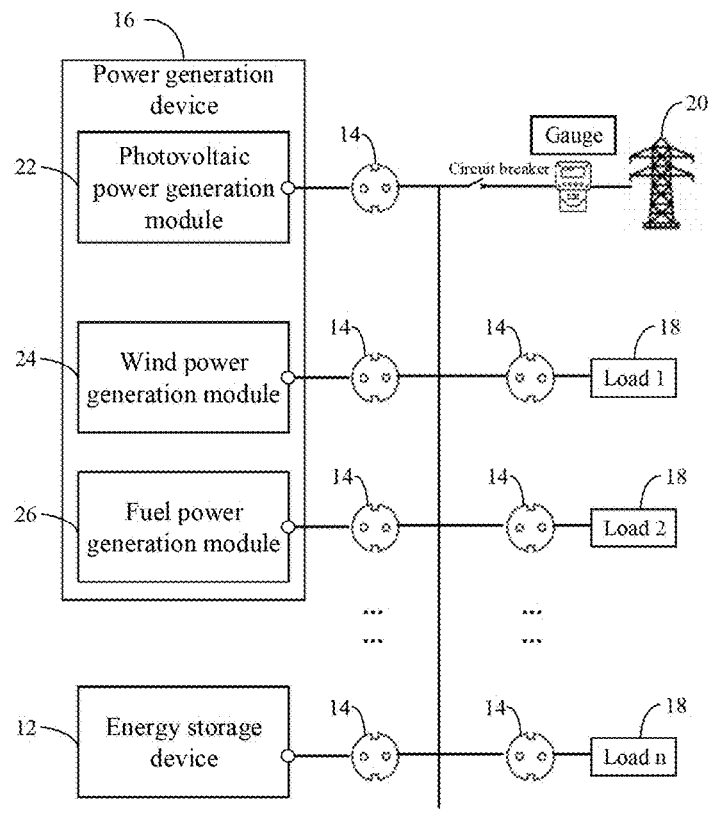
FIG. 3 is a schematic structural view of a home energy system according to an embodiment of the present disclosure.

Referring to FIGS. 1 to 3, according to embodiments of the present disclosure, there is provided a control method for a home energy system 100. The home energy system 100 includes a power distribution device 14 connected to a plurality of loads 18, a non-time-shifting power generation device, and an energy storage device 12. The control method for the home energy system 100 includes the following actions.

Step S101, when the home energy system 100 is in a grid-connected state and the non-time-shifting power generation device is in a power-supply state, obtaining predicted consumed electric power of the plurality of loads 18 and predicted generated electric power of the non-time-shifting power generation device during each electricity consumption time period of a current day.

Step S103, when net power of the home energy system during each electricity consumption time period of the current day is greater than zero, controlling, based on an electricity price of a public power grid 20 during each electricity consumption time period of the current day, the home energy system 100 to be powered by the energy storage device 12 or powered by the public power grid 20 to enable an electricity bill to meet a predetermined condition, the net power of the home energy system 100 during each electricity consumption time period of the current day being a difference between the predicted generated electric power and the predicted consumed electric power.

Step S105, when the net power of the home energy system 100 during each electricity consumption time period of the current day is smaller than zero, controlling, based on the electricity price during each electricity consumption time period of the current day, the non-time-shifting power generation device to output electric energy to the energy storage device 12 or the public power grid 20 to enable the electricity bill to meet the predetermined condition.

The above-described control method for the home energy system 100 helps a user to fine-tune control of the home energy system 100 by predicting the net power of the home energy system 100 and controlling the power supply and consumption of a power generation device 16, the loads 18, and the energy storage device 12 that are connected to the home energy system 100 in combination with the electricity price of the public power grid.

In an exemplary embodiment of the present disclosure, as illustrated in FIG. 3, the home energy system 100 includes the energy storage device 12, the power distribution device 14, the power generation device 16, and the plurality of loads 18 connected to the power distribution device 14. In addition, the home energy system 100 is connected to the public power grid 20, which allows the home energy system 100 to be powered by the public power grid 20 for use by the loads 18. Alternatively, the power generation device 16 may be controlled to generate the power or the energy storage device 12 may be controlled to output electric energy to the public power grid 20 for revenue.

The home energy system 100 generates an electricity consumption price when powered by the public power grid 20, and the home energy system 100 generates an on-grid electricity price when the home energy system 100 outputs electric energy to the public power grid 20. Operation of the home energy system 100 generates the electricity bill. In this case, the electricity bill is the electricity consumption price minus the on-grid electricity price. The electricity bill may be numerically negative, meaning that revenue obtained by the user by outputting the electric energy to the public power grid 20 is greater than cost spent by the user for being powered by the public power grid 20. When the electricity bill is a positive value, a smaller electricity bill means that the user has lower expense. When the electricity bill is a negative value, a smaller electricity bill with a larger absolute value means that the user has higher revenue.

The power generation device 16 is configured to charge the energy storage device 12 to supply power directly to the loads 18. The power generation device 16 includes a non-time-shifting power generation device and a time-shifting power generation device.

The non-time-shifting power generation device is a power generation device 16 that is subject to a power generation condition and cannot control a power generation time and amount. For example, the non-time-shifting power generation device may include a photovoltaic power generation module 22, and a wind power generation module 24. The photovoltaic power generation module 22 can generate power only under a lighting condition, and the wind power generation module 24 can generate power only when a wind speed reaches a power generation requirement.

A time-shifting power generation device, such as a fuel power generation module 26, can generate power at any time period when fuel is added. In addition, when the energy storage device 12 is added to the home energy system 100, the energy storage device 12 may store power that is generated by the photovoltaic power generation module 22 and the wind power generation module 24 to supply power to the loads 18 at a time period when the power is needed. In this case, the energy storage device 12 may also serve as a time-shifting power generation device.

In practice, modules included in the power generation device 16 may be determined based on an actual environmental condition (e.g., a light condition and a wind condition, etc.). When the home energy system 100 is connected to the public power grid 20, the home energy system 100 has both grid-connected and off-grid states. The grid-connected state indicates that the public power grid 20 is in the power-supply state. In this case, the home energy system 100 may or may not draw power from the public power grid 20. The off-grid state indicates that the public power grid 20 is in a non-power-supply state. In this case, the home energy system 100 is unable to draw power from the public power grid 20 and unable to deliver electric energy to the public power grid 20.

The energy storage device 12 is configured to receive electric energy outputted from the power generation device 16 for charging and supply power to the loads 18. The energy storage device 12 may include one or more battery packs.

The power distribution device 14 is connected to the energy storage device 12, the power generation device 16, the plurality of loads 18, and the public power grid 20. The power distribution device 14 is configured to control the power-on and the power-off state of the loads 18 and also to control the home energy system 100 to be powered by one or more of the energy storage device 12, the power generation device 16, and the public power grid 20. The power distribution device 14 includes a smart socket, a smart plug, and a smart air switch, or other power distribution devices 14 has a control module and a communication module internally and capable of controlling a device connected thereto. The power distribution device 14 has a communication function and can read data such as a voltage, a current, and a temperature of the loads 18, the energy storage device 12, and the power generation device 16 that are connected to the power distribution device 14, the consumed electric power of the loads 18 as well as the generated electric power of the power generation device 16, and send the data to a higher-level management system for management.

The higher-level management system may be an energy management device 10 having an energy management system (EMS). The EMS may, based on the data information of the loads 18 and the energy storage device 12 obtained by the power distribution device 14, uniformly regulate and manage the home energy system 100, for example, controlling the energy storage device 12, the power generation device 16, or the public power grid 20 to supply power to the power distribution device 14, or controlling the power distribution device 14 to switch the power-on state and power-off state of the loads 18.

The loads 18 of the home energy system 100 include all electric devices in a home environment, including but not limited to a lamp, a refrigerator, an oven, a range hood, a microwave oven, a rice cooker, a washing machine, a dryer, a water heater, an electric heater, a television, a computer, a new energy vehicle, etc. All the loads 18 in the home environment are divided into multi-level loads 18 with different power consumption priority based on their characteristics or uses. For example, the loads 18 in the home environment may be divided into a first load and a second load based on a degree of correlation between an electricity consumption demand and an electricity consumption time of the loads 18. The first load has a higher power-on priority than the second load.

The first load may be a non-time-shifting load. The non-time-shifting load is defined as a load with high real-time performance of electricity consumption. For example, a refrigerator needs to be turned on at all time periods throughout a day, a cooking appliance such as the rice cooker and the range hood must be turned on at a time period of the day when cooking is required, and the lamp must be turned on at a time period of the day when natural light is insufficient. The second load may be a time-shifting load. The time-shifting load is defined as a load with low real-time performance of the electricity consumption. The time-shifting load can be used at any time period throughout the day without affecting the user's usage effect and experience. Examples include the washing machine, the dryer, the water heater, and charging of the new energy vehicle. When the home energy system 100 has the energy storage device 12, the energy storage device 12 may be charged by the public power grid 20 or the power generation device 16. In this case, the energy storage device 12 may serve as a time-shifting load.

In one embodiment, the loads 18 of the home energy system 100 include a lamp, a refrigerator, an oven, a range hood, a microwave oven, a rice cooker, a washing machine, a dryer, a water heater, an electric heater, a television, a computer, and a new energy vehicle. The first load includes the refrigerator, the lamp, the oven, the range hood, the microwave oven, the rice cooker, the electric heater, the air conditioner, the television, and the computer. The second load includes the dryer, the water heater, the electric heater, and the new energy vehicle.

The power-on state and the power-off state of the load 18 indicate whether or not the load 18 is in communication with the power supply circuit of the power distribution device 14. The loads 18 include a load 18 that is in a operational state upon being energized, such as the refrigerator, the water heater, etc., and a load 18 that need to be controlled to be in a operational state, such as the washing machine, the rice cooker, etc., that are in a standby state after being energized and need an operation such as selecting an operational mode to enter an operational state. In this case, when such load 18 switches from the power-off state to the power-on state, the load 18 also needs to communicate with a controller inside the load 18 through the EMS to control the load 18 to enter the operational state. For a load 18 that has no internal controller, the EMS may control the load 18 to enter the operational state through an infrared device on the load 18.

Figure 4:
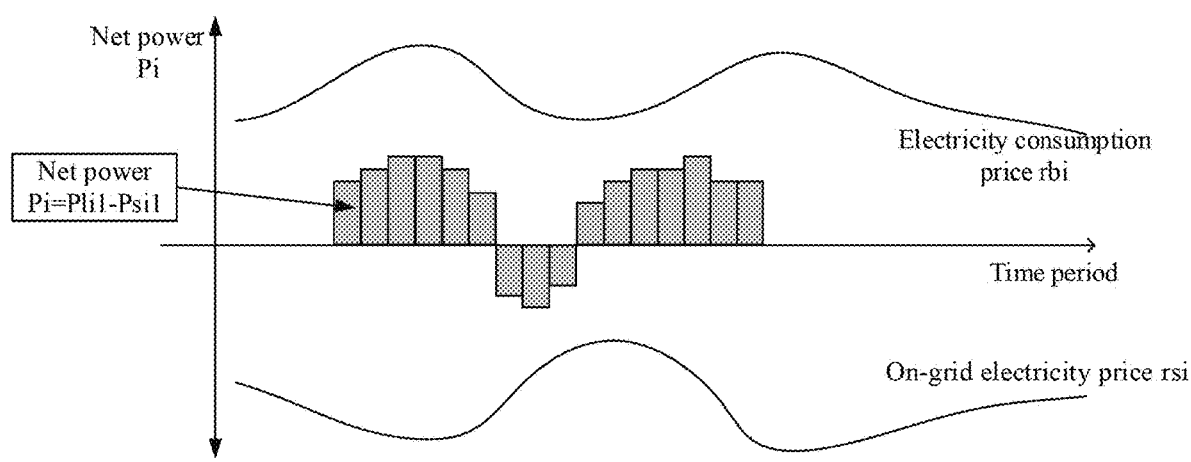
FIGS. 4 to 6 are schematic diagrams of an electricity price and net power of a public power grid according to an embodiment of the present disclosure.
Figure 5:
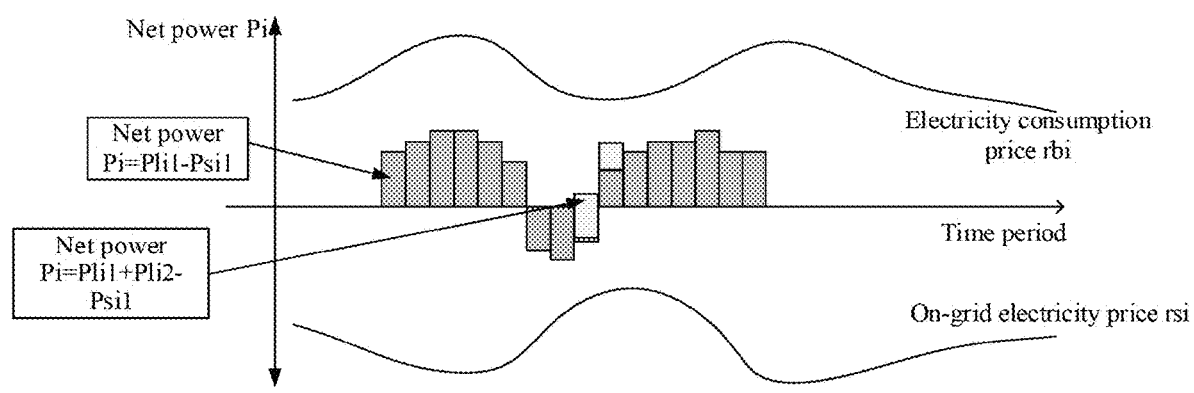
Figure 6:
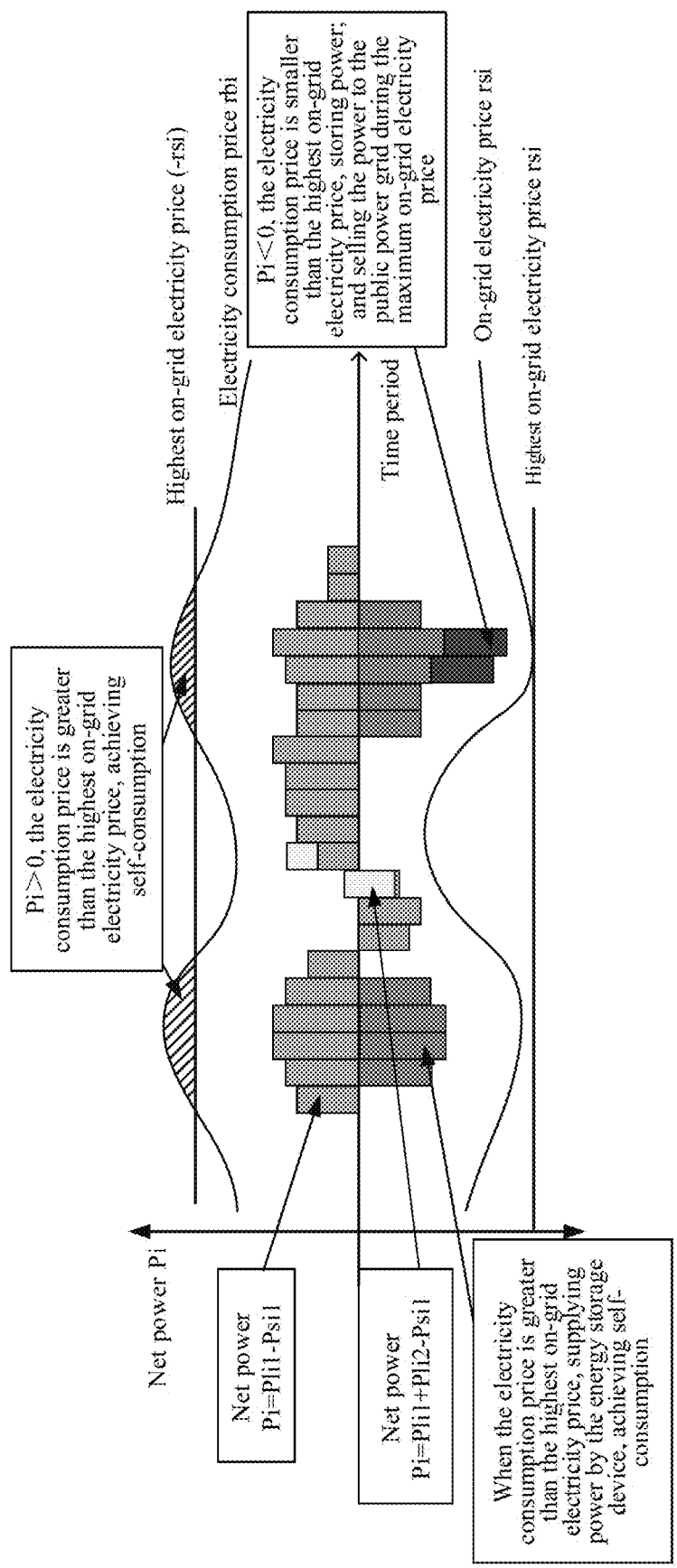

To control the home energy system 100, referring to FIGS. 4 to 6, for an electricity price of the public power grid, the electricity price of the public power grid is first predicted for each time period of a current day. When the electricity price of the public power grid is not fixed, data of an electricity price of the public power grid of a previous day, a previous three days, or a certain time period may be extracted, and an average value of each time period is taken to make a prediction of a corresponding time period of the current day for the electricity price of the public power grid. The electricity price of the public power grid includes an electricity consumption price and an on-grid electricity price, both of which can be predicted separately using historical data.

In other embodiments, each of the electricity consumption price and the on-grid electricity price has a fixed price during each electricity consumption time period of a day. In this case, and the electricity consumption price and the on-grid electricity price of the day can be obtained directly.

For the loads 18, first, the first load is determined to be a non-time-shifting load and the second load is a time-shifting load. The non-time-shifting load needs to maintain a power-on state during all time periods of the day and thus can be used by the user at any time. In order to meet a predetermined condition of a lowest electricity price, the time-shifting load is controlled to be in the power-on state only during a time period of the day when the electricity price is the lowest, and the time-shifting load is available for use by the user during this time period.

When predicting consumed electric power of the first load and the second load of the user for each time period of the day, data of consumed electric power of each load 18 for the previous day, the previous three days or the certain time period are extracted, and consumed electric power of each load 18 during each electricity consumption time period is averaged, and therefore first consumed electric power of the first load and second consumed electric power of the second load during each electricity consumption time period of the day can be predicted. Since the users have different electricity consumption habits in different seasons, referred historical data should not be too long when predicting the electric power. In addition, the users may also have different electricity consumption habits on weekdays and rest days. FIG. 4 shows predicted consumed electric power of the first load during each time period of a day, and FIG. 5 shows predicted consumed electric power of the first load and the second load during each time period of a day.

When predicting the consumed electric power, for a weekday, the consumed electric power may be predicted by extracting power consumption data of a weekday a while ago; and for a rest day, the consumed electric power may be predicted by extracting power consumption data of a rest day a while ago to enhance accuracy of the prediction.

Similarly, generated electric power of the non-time-shifting power generation device in a day is predicted based on generated electric power of the non-time-shifting power generation device a while ago.

After obtaining predicted generated electric power, first predicted consumed electric power and second predicted consumed electric power, net power of the home energy system during each power consumption time period of the current day may be obtained.

The day is divided into 12/24/48/72/144/288 time periods, each of which is 2 h/1 h/30 min/20 min/10 min/5 min, and an electricity consumption price of each time period is averaged to obtain a corresponding electricity consumption price during each time period. An electricity consumption price during the user's i-th time period is recorded as $rb_i$ (Price buy, an electricity consumption price during an i-th time period), an on-grid electricity price during the user's i-th time period is recorded as $rs_i$ (Price sell, an electricity selling price during the i-th time period), and consumed electric power of a non-time-shifting load during the user's i-th time period is recorded as $Pli1$ (Power load, consumed electric power of a non-time-shifting load during the i-th time period), consumed electric power of a time-shifting load during the user's i-th time period is recorded as $Pli2$ (Power load, electric power of a time-shifting load during the i-th time period), and non-time-shifting generated electric power during the user's i-th time period is recorded as $Psi1$ (Power source, non-time-shifting generated electric power during the i-th time period).

As illustrated in FIG. 6, net power $Pi=(Pli1+Pli2)-Psi1$ during the i-th time period. The time-shifting load consumes the electricity only during the time period when the electricity consumption price is the lowest. Therefore, during a time period when the electricity consumption price is higher than the lowest electricity consumption price, $Pli2=0$. In this case, net power $Pi=Pli1-Psi1$.

When $Pi>0$, it means that total consumed electric power of the load 18 is greater than non-time-shifting generated electric power during this time period. In order to minimize electricity consumption expenditure, it is necessary to compare the electricity consumption price and the on-grid electricity price to determine whether the home energy system 100 is to be powered by the energy storage device 12 or powered by the public power grid 20.

When $Pi<0$, it means that the total consumed electricity power of the load 18 is smaller than the non-time-shifting generated electric power during this time period. In this case, there is a surplus of electric energy from the non-time-shifting generated electric power. In order to maximize revenue from electricity selling, it is necessary to compare the electricity consumption price and the on-grid electricity price to control output of electric energy from the non-time-shifting power generation device to the energy storage device 12 or the public power grid 20.

When $Pi=0$, the non-time-shifting generated electric power matches the total consumed electric power and no additional control is required.

In the embodiments of the present disclosure, the predetermined condition is to minimize the electricity bill. It should be understood that in other embodiments, the predetermined condition is not limited to minimizing the electricity bill. For example, in one embodiment, the predetermined condition may also be to ensure maximum revenue from power generation.

Figure 7:
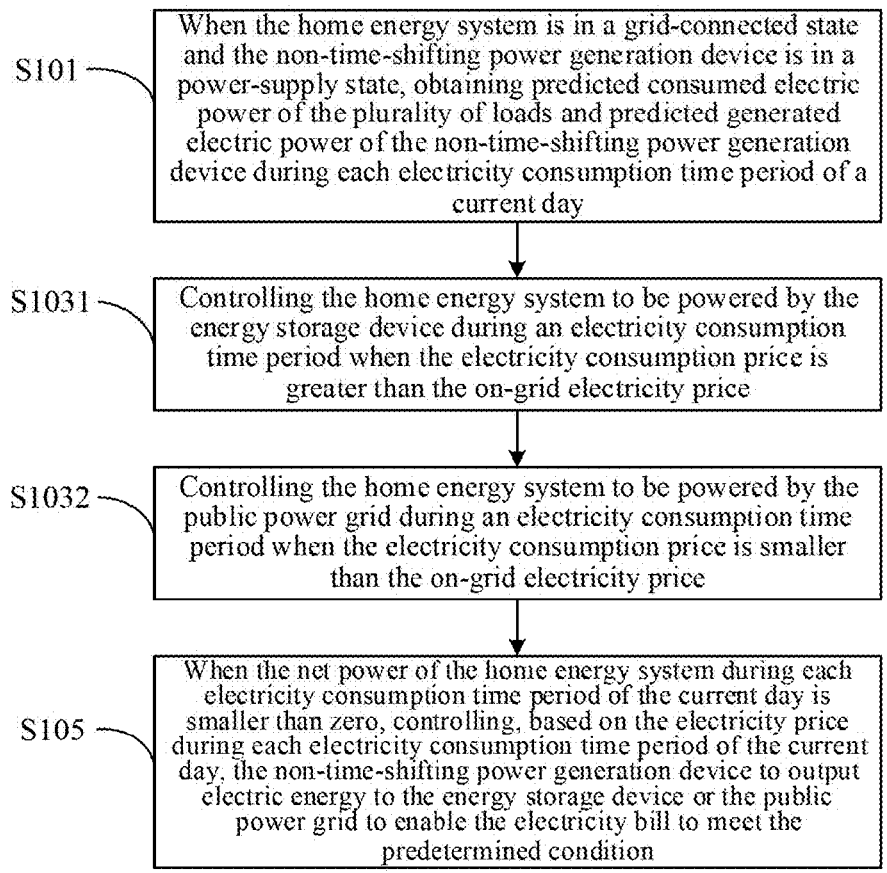
FIGS. 7 to 12 are flowcharts of a control method for a home energy system according to an embodiment of the present disclosure.

Referring to FIG. 7, in some embodiments, the electricity price of the public power grid 20 during each electricity consumption time period of the current day includes an electricity consumption price and an on-grid electricity price. Step S103 includes the following actions Step S1031, the home energy system 100 is controlled to be powered by the energy storage device 12 during an electricity consumption time period when the electricity consumption price is greater than the on-grid electricity price.

Step S1032, the home energy system 100 is controlled to be powered by the public power grid 20 during an electricity consumption time period when the electricity consumption price is smaller than the on-grid electricity price.

In this way, the electricity consumption expenditure can be minimized to meet the predetermined condition.

In an exemplary embodiment of the present disclosure, when $Pi>0$, it indicates that total consumed electric power of the loads 18 during this time period is greater than the non-time-shifting generated electric power. In this case, the energy storage device 12 may be used to supply power some of the loads 18, or some of the loads 18 may be powered by the public power grid 20 for use. At this time, it is necessary to compare the electricity consumption price and the on-grid electricity price.

During the electricity consumption time period when the electricity consumption price is greater than the on-grid electricity price, the electricity consumption expenditure from being powered by the public power grid 20 will be increased. In this case, the energy storage device 12 is controlled to supply power to the power distribution device 14.

During the time period when the electricity consumption price is smaller than the on-grid electricity price, at which time the electricity consumption expenditure from being powered by the public power grid 20 will be reduced, the home energy system 100 may be controlled to be power by the public power grid 20.

Figure 8:
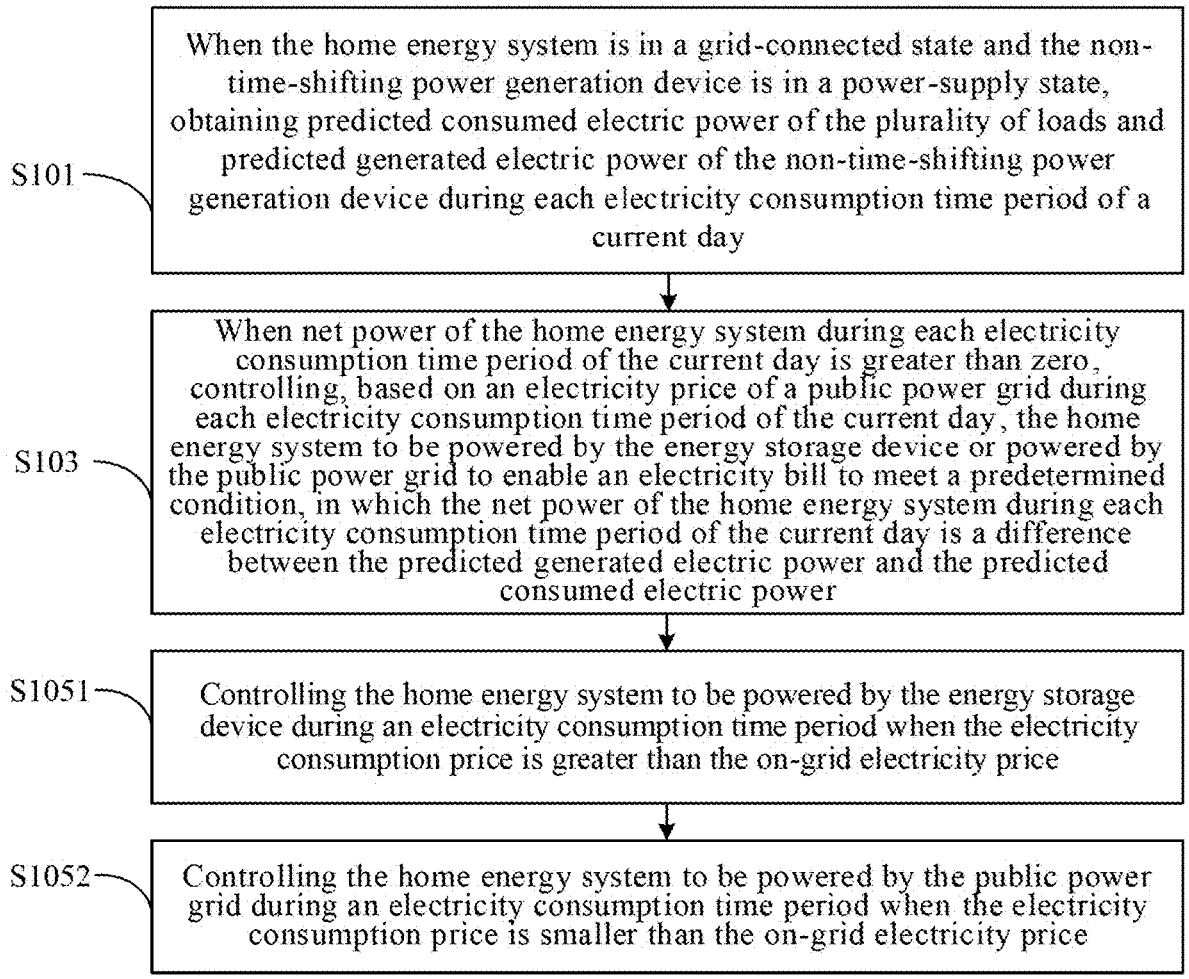

Referring to FIG. 8, in some embodiments, the electricity price of the public power grid 20 during each electricity consumption time period of the current day includes an on-grid electricity price. Step S105 includes the following actions.

Step S1051, when the net power of the home energy system 100 during each electricity consumption time period of the current day is smaller than zero, the non-time-shifting power generation device is controlled to output the electric energy to the energy storage device 12.

Step S1052, the energy storage device 12 is controlled to output electric energy to the public power grid 20 during an electricity consumption time period when an on-grid electricity price is greater than a predetermined on-grid electricity price.

In this way, the electricity selling revenue may be maximized to meet the predetermined condition.

In an exemplary embodiment of the present disclosure, when Pi<0, it indicates that the total consumed electric power of the loads 18 during this time period is smaller than the non-time-shifting generated electric power. In this case, the non-time-shifting generated electric power has a surplus of electric energy. In order to maximize the electricity selling revenue, when Pi<0, the surplus electric energy is first stored in the energy storage device 12, and the surplus electric energy is delivered to the public power grid 20 during a time period when the on-grid electricity price is the largest. When the time period with Pi<0 is the time period when the on-grid electricity price is the largest, the electric energy is directly output to the public power grid 20.

The predetermined on-grid electricity price may be a highest on-grid electricity price in ranking of the on-grid electricity prices during the time periods of the day, at which time the delivery of the electric energy to the public power grid 20 maximizes the electricity selling revenue.

In one embodiment, there may be a plurality of time periods of the day with the highest on-grid electricity prices, and it may be selected to output the electric energy to the public power grid 20 at a time period with a highest on-grid electricity price closest to a current time period.

The time period with the highest on-grid electricity price is determined only from the current time period onwards, among all remaining time periods of the day. For example, within all time periods of a day, if a highest on-grid electricity price is from 10 a.m. to 11 a.m. and a second highest on-grid electricity price is from 2 p.m. to 3 p.m., before 11 a.m., a time period with a highest grid electricity price is from 10 a.m. to 11 a.m., and after 11 a.m., a time period with a highest grid electricity price is from 2 p.m. to 3 p.m.

Figure 9:
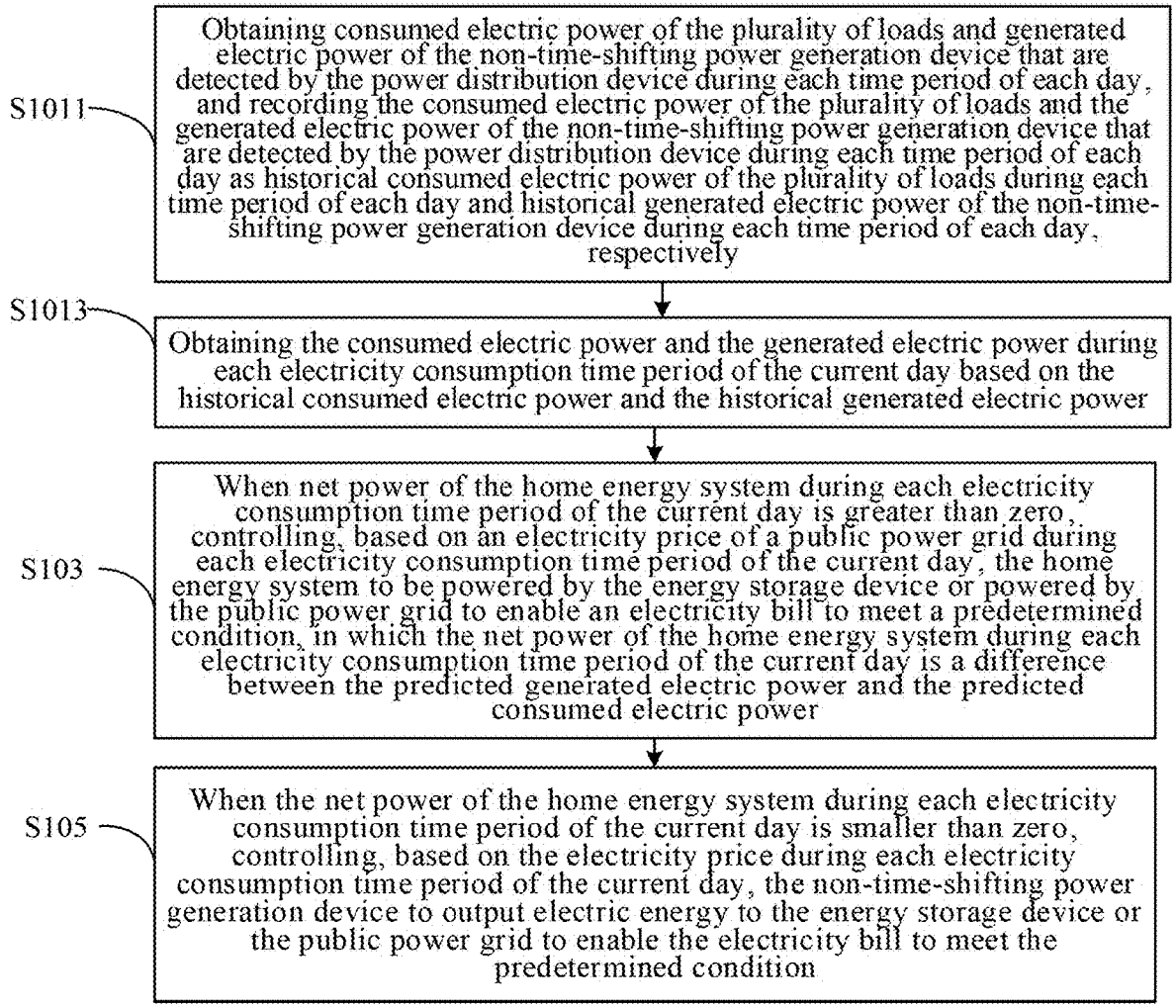

Referring to FIG. 9, in some embodiments, the power distribution device 14 is configured to detect the consumed electric power of the plurality of loads 18 and the generated electric power of the non-time-shifting power generation device. Step S101 includes the following actions.

Step S1011, consumed electric power of the plurality of loads 18 and generated electric power of the non-time-shifting power generation device that are detected by the power distribution device 14 during each time period of each day are obtained, and the consumed electric power of the plurality of loads 18 and the generated electric power of the non-time-shifting power generation device that are detected by the power distribution device during each time period of each day are recorded as historical consumed electric power of the plurality of loads during each time period of each day and historical generated electric power of the non-time-shifting power generation device during each time period of each day, respectively.

At step S1013, the consumed electric power and the generated electric power during each electricity consumption time period of the current day are obtained based on the historical consumed electric power and the historical generated electric power.

In this way, power consumption data of the loads 18 and power generation data of the non-time-shifting power generation device can be recorded by the power distribution device 14, to fine-tune management based on the power supply and consumption of the home energy system.

In an exemplary embodiment of the present disclosure, the power distribution device 14 is configured to detect the consumed electric power of the loads 18 or the generated electric power of the non-time-shifting power generation device, and to send the detected data to the energy management device 10 for recording. Therefore, the energy management device 10 may predict consumed electric power of the loads 18 and generated electric power of the non-time-shifting power generation device for a next 24 hours or for a future time period based on the consumed electric power of each load 18 and the generated electric power of the non-time-shifting power generation device.

In one embodiment, the energy management device 10 may establish communication with the power distribution device 14 via a wired connection or a wireless connection. The wired connection may be a connection of the energy management device 10 to the power distribution device 14 using a tangible medium, such as a metallic wire or a fiber optic, to establish the communication and achieve signal transmission. The wireless connection may be a connection of the energy management device 10 to the power distribution device 14 via Wi-Fi, a 4-th generation mobile communication technology (4G), or Bluetooth, etc., to establish the communication and achieve signal transmission. In an exemplary embodiment of the present disclosure, when the energy management device 10 establishes communication with the power distribution device 14, the energy management device 10 may obtain data from the power distribution device 14. For example, the energy management device 10 may obtain the consumed electric power of each load 18 through the power distribution device 14, thereby obtaining the total consumed electric power of all loads 18 as well as generated electric power of each non-time-shifting power generation device, thereby obtaining total generated electric power of all non-time-shifting power generation devices.

In some embodiments, each of the plurality of loads 18 is divided into a first load or a second load. The first load has a higher power-on priority than the second load when the home energy system 100 is in the grid-connected state. The electricity price of the public power grid 20 during each electricity consumption time period of the current day includes an electricity consumption price. The control method for the home energy system 100 includes: when the home energy system 100 is in the grid-connected state, based on the electricity consumption price, controlling the power distribution device 14 to enable the first load to be in a power-on state during each electricity consumption time period, and controlling the second load to be in a power-on state during an electricity consumption time period when the electricity consumption price is smaller than a first predetermined value, and controlling the second load to be in a power-off state during an electricity consumption time period when the electricity consumption price is greater than the first predetermined value.

In this way, based on the electricity consumption prices in different time periods, a load 18 having a higher power-on priority is controlled to be in the power-on state preferentially and a load 18 having a lower power-on priority is controlled to be in the power-on state during a time period with a low electricity consumption price to minimize the electricity bill.

In an exemplary embodiment of the present disclosure, when the energy storage device 12 is in the power-off state, the power distribution device 14 needs to be powered using the public power grid 20.

The first load is controlled to remain in the power-on state during each electricity consumption time period based on the electricity consumption price for each time period of the day. The second load is controlled to be in the power-on state during the electricity consumption time period when the power consumption price is smaller than the first predetermined value, and the second load is controlled to be in the power-off state during the power consumption time period when the power consumption price is greater than the first predetermined value.

Further, power-on priority of each load 18 or an associated group of loads 18 among the first loads and the second loads may be further divided. For example, the first load includes a first priority load and a second priority load, the second load includes a third priority load and a fourth priority load. The power-on priority of the first priority load, the second priority load, the third priority load, and the fourth priority load decreases sequentially.

In one embodiment, the first load further includes a first priority load and a second priority load. The second load includes a third priority load and a fourth priority load. During a time period when an electricity price is higher than the first predetermined value, the first priority load and the second priority load may be controlled to be in a power-on state, and the third priority load and the fourth priority load may be controlled to be in a power-off state. During a time period when an electricity price is lower than the first predetermined value, the third priority load and the fourth priority load are controlled to be in a power-on state. The power-on priority may indicate high or low real-time performance of electricity consumption of the load 18. A load 18 having a lower real-time performance of electricity consumption is controlled to turn on during a time period with a lower electricity price, which may effectively reduce electricity bill expenditure.

In one embodiment, the first predetermined value is a lowest electricity consumption price of the day, i.e., the power distribution device 14 is controlled to enable the second load to be in the power-on state during a time period corresponding to the lowest electricity consumption price, and to be in the power-off state during other time periods. In this way, the electricity bill expenditure can be minimized to meet the predetermined condition.

In some embodiments, each load of the plurality of loads 18 is configured with an importance level. A load 18 with a high importance level has a higher power-on priority than a load 18 with a low importance level. The control method includes the following action.

Step S109: when the home energy system 100 is in an off-grid state and the energy storage device 12 is in the power-supply state, the power distribution device 14 is controlled to be powered by the energy storage device 12, and a power-on state and a power-off state of each of the plurality of loads 18 are controlled based on an importance level of each of the plurality of loads 18.

In this way, when the energy storage device 12 has a limited amount of power, the power-on state and the power-off state of the load 18 may be controlled base on the power-on priority of the load 18, and an operational time of a load 18 with a high power-on priority is prolonged.

In an exemplary embodiment of the present disclosure, when the home energy system 100 is in an off-grid state and the energy storage device 12 is in the power-supply state, the power distribution device 14 is controlled to be powered by the energy storage device 12.

The importance level of the load 18 may be set by the user or may be preset in the home energy system 100. The importance level of the load 18 determines the power-on priority of the load 18, and a load with a high importance level has a higher power-on priority than a load with a low importance level.

In this case, based on the importance level of the load 18, a load 18 with a high importance level may be controlled to be in the power-on state and a load 18 with a low importance level to be in the power-off state, to save power of the energy storage device 12 and prolong the operational time of the load 18 with the high importance level.

Figure 10:
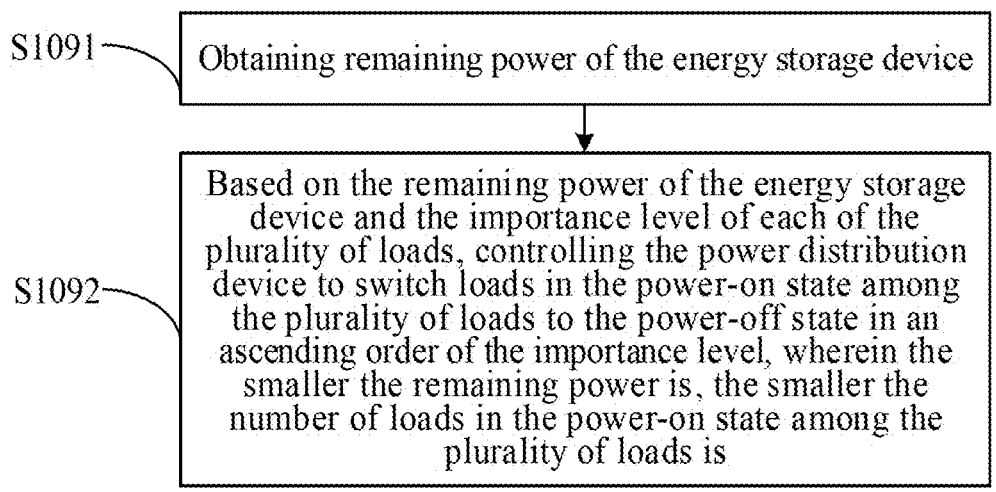

Referring to FIG. 10, in some embodiments, Step S109 includes the following actions.

Step S1091, remaining power of the energy storage device 12 is obtained.

Step S1092, based on the remaining power of the energy storage device 12 and the importance level of each of the plurality of loads 18, controlling the power distribution device 14 to switch loads in the power-on state among the plurality of loads 18 to the power-off state in an ascending order of the importance level. The smaller the remaining power is, the smaller the number of loads 18 in the power-on state among the plurality of loads 18 is.

In this way, the power-on state and the power-off state of the load 18 may be controlled based on the power-on priority of the load 18 in the off-grid state to ensure normal operation of the load 18 having the high power-on priority.

In an exemplary embodiment of the present disclosure, in the off-grid state, the home energy system 100 is unable to draw power from the public power grid 20. In this case, the energy storage device 12 is an important power supply. To ensure normal operation of the load 18 with a high importance level, the power distribution device 14 may be controlled to enable all loads 18 with the low importance level are in a power-off state when the remaining power of the energy storage device 12 is smaller than first predetermined power.

In one embodiment, the plurality of loads 18 of the importance level includes a first priority load, a second priority load, a third priority load, and a fourth priority load, whose power-on priority decreases sequentially. As the remaining power decreases, the fourth priority load, the third priority load, and the second priority load are sequentially in a power-off state, and only the first priority load is controlled to be in the power-on state when the remaining power of the energy storage device 12 is smaller than the first predetermined power.

In one embodiment, the first predetermined power is 20%. In other embodiments, the first predetermined power may be set based on a number, consumed electric power, etc., of loads 18 with a highest importance level.

Figure 11:
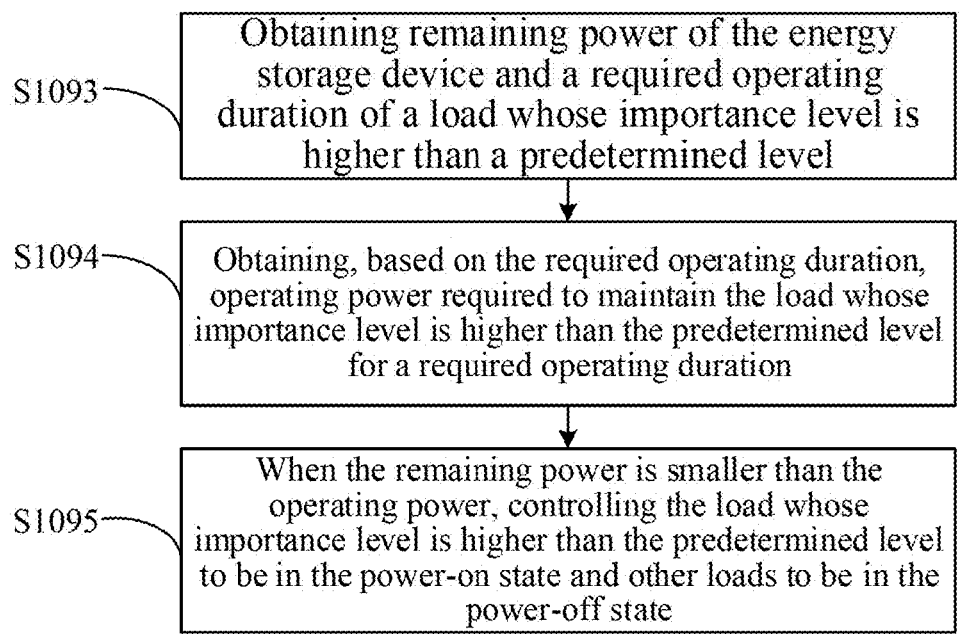

Referring to FIG. 11, in some embodiments, Step S109 includes the following actions.

Step S1093, remaining power of the energy storage device 12 and a required operating duration of a load 18 whose importance level is higher than a predetermined level are obtained.

Step S1094, operating power required to maintain the load 18 whose importance level is higher than the predetermined level for a required operating duration is obtained based on the required operating duration.

Step S1095, when the remaining power is smaller than the operating power, the load 18 whose importance level is higher than the predetermined level is controlled to be in the power-on state and other loads are controlled to be in the power-off state.

In this way, in the off-grid state, the power-on state and the power-off state of the load 18 can be controlled based on the importance level of the load 18, which ensures that the load 18 with the high importance level may maintain an operational state during the required operating duration.

In an exemplary embodiment of the present disclosure, in the off-grid state, in order to maintain a required operating duration of some loads 18 with the high importance level, the operating power required to maintain the load 18 with the high importance level in the required operating duration may be calculated based on operational power and the required operating duration of the load 18 with the high importance level. When the remaining power of the energy storage device 12 is smaller than the operational power, the power distribution device 14 may be controlled to enable the other loads 18 to be in the power-off state, and maintain the loads 18 with the high importance level to be in the power-on state. As such, the normal operation of the load 18 with the high importance level within the required operating duration can be ensured.

For example, the loads 18 include a first priority load, a second priority load, and a third priority load with the importance level from high to low, whose power-on priority decreases sequentially. When the predetermined level is second priority and the remaining power is smaller than the operational power, the first priority load is controlled to be in the power-on state, and the second priority load and the third priority load are controlled to be in the power-off state. The predetermined level may be set based on user requirements.

Figure 12:
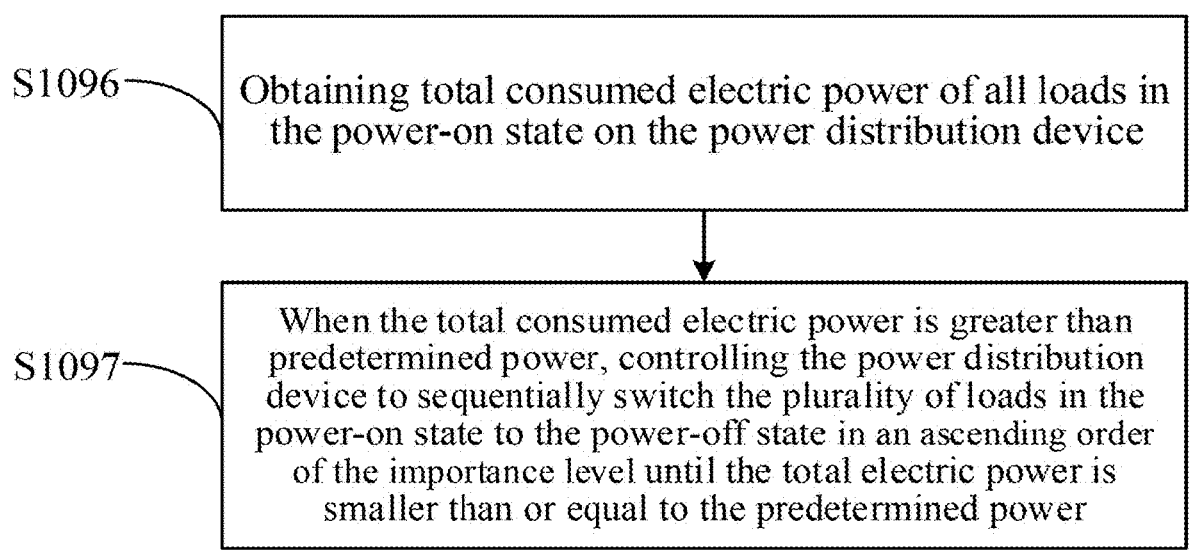

Referring to FIG. 12, in some embodiments, Step S109 includes the following actions.

Step S1096, total consumed electric power of all loads 18 in the power-on state on the power distribution unit 14 is obtained.

Step S1097, when the total consumed electric power is greater than predetermined power, the power distribution device 14 is controlled to sequentially switch the plurality of loads 18 in the power-on state to the power-off state in an ascending order of the importance level until the total consumed electric power is smaller than or equal to the predetermined power.

In this way, the power-on state and the power-off state of the load 18 can be controlled based on the importance level of the load 18 in the off-grid state to ensure that power supply is prioritized to the load 18 with the high importance level.

In an exemplary embodiment of the present disclosure, in the off-grid state, the power-on state and power-off state of the loads 18 can be controlled based on the total consumed electric power of all the loads 18 and the importance level of the loads 18 in the power-on state.

In one embodiment, the loads 18 include a first priority load and a second priority load with an importance level from high to low. In this case, a predetermined power is set, and when total consumed electric power of all loads 18 in the power-on state on the power distribution device 14 is greater than the predetermined power, the power distribution device 14 is controlled to enable the second priority load to be in the power-off state and maintain the first priority load to be in the power-on state.

In one embodiment, the loads 18 include a first priority load, a second priority load, and a third priority load with an importance level from high to low. Each of the first priority load, the second priority load, and the third priority load has power-on priority decreasing sequentially. In this case, a predetermined power is set, and when total consumed electric power of all the loads 18 in the power-on state on the power distribution device 14 is greater than the predetermined power, the power distribution device 14 is controlled to enable the second priority load and the third priority load to be in the power-off state and maintain the first priority load to be in the power-on state.

In one embodiment, the loads 18 include a first priority load, a second priority load, and a third priority load with an importance level from high to low. In this case, two predetermined power are set, which are a first predetermined power and a second predetermined power, respectively. The first predetermined power is smaller than the second predetermined power. In this way, when total consumed electric power of all loads 18 in the power-on state reaches the first predetermined power, the power distribution device 14 is controlled to enable the third priority load 18 to be in the power-off state and maintain loads 18 with the first priority and second priority to be in the power-on state. When total consumed electric power of all loads 18 in the power-on state reaches the second predetermined power, the power distribution device 14 is controlled to enable the second priority load and the third priority load to be in the power-off state and maintain the first priority load to be in the power-on state.

It should be understood that when the loads 18 include more than three loads 18 having different power-on priority and there are three or more predetermined powers, it is possible to control the loads 18 having different priority can be controlled based on the method described above.

In some embodiments, the importance level of the load is set by default by the home energy system and/or by input instructions from the user.

In this way, the importance level of the load 18 may be set as desired by the user.

In an exemplary embodiment of the present disclosure, the importance level of the load 18 may be set by default by the home energy system 100, for example, based on intensity of electricity consumption demand of the load 18 under normal circumstances. Alternatively, the importance level of the load 18 may be set by the input instructions from the user. The importance level of the load 18 may be set based on the user's usage needs or preferences. For example, if the user needs to maintain operation of a computer for all 24 hours, an importance level of the computer may be set to the highest. For example, if the user does not need to use a cooking appliance, an importance level of all cooking appliances may be set to the lowest. Alternatively, the power-on priority of the load 18 may be partially set by default by the home energy system 100 and partially set by the user.

In some embodiments, the energy storage device 12 is in a non-power-supply state when the remaining power of the energy storage device 12 is smaller than the second predetermined power, and the energy storage device 12 is in a power-supply state when the remaining power of the energy storage device 12 is greater than the second predetermined power.

In this way, whether the energy storage device 12 is in the power-supply state may be determined based on the remaining power of the energy storage device 12.

In an exemplary embodiment of the present disclosure, when the remaining power of the energy storage device 12 is smaller than the second predetermined power, the energy storage device 12 is in the non-power-supply state. In this case, the power generation device 16 may be controlled to charge the energy storage device 12. When the remaining power of the energy storage device 12 is greater than the second predetermined power, the energy storage device 12 may be controlled to supply power to the load 18. Alternatively, the energy storage device 12 may have sufficient power for use in the off-grid state. The second predetermined power may be a system default setting or a setting based on user demand. In one embodiment, the second predetermined power is 20%. When the remaining power of the energy storage device 12 is smaller than 20%, the energy storage device 12 is in a non-power-supply state. The first predetermined power may be the same as the second predetermined power, or the first predetermined power and the second predetermined power may be set separately.

In summary, in the grid-connected state, the energy storage device 12, the power generation device 16, and the load 18 of the home energy system 100 are controlled based on the generated electric power, the consumed electric power, and the electricity consumption price of the public power grid to achieve optimization of the electricity bill. In the off-grid state, it is necessary to control the switching of the loads 18 with different importance levels to ensure that the loads 18 with the higher importance level may maintain an operating state for a longer duration with limited power consumption. By the above method, the use of the power distribution device 14 to manage the energy storage device 12, the power generation device 16, and each load 18 that are connected to the home energy system 100 may help the user to fine-tune management of the loads 18 of the home energy system 100.

Referring to FIGS. 2 and 3, a home energy system 100 of an embodiment of the present disclosure includes an energy management device 10, an energy storage device 12, a power distribution device 14, and a non-time-shifting power generation device. The energy management device 10 is electrically connected to the power distribution device 14 and the energy storage device 12 and the non-time-shifting power generation device, and the power distribution device 14 is connected to a plurality of loads 18.

The energy management device 10 is configured to implement the control method for the home energy system 100 as described in any of the above embodiments.

In an exemplary embodiment of the present disclosure, the energy management device 10 may uniformly control the power supply and usage of the home energy system 100, for example, may control the power distribution device 14 to be powered by the energy storage device 12 or to be powered by the public power grid 20. Alternatively, the power distribution device 14 may be controlled to deliver the electric energy to the energy storage device 12 or to the public power grid 20. Alternatively, the energy management device 10 may also control the power distribution device 14 to enable the loads with different priority to be in the power-on or the power-off state.

The home energy system 100 includes a load 1, a load 2, ..., load n. In the grid-connected state, the load 1, the load 2, ..., load n may be divided into a non-time-shifting load (a first load) and a time-shifting load (a second load). In the off-grid state, the load 1, the load 2, ..., load n may be divided into a plurality of loads with different importance levels.

The energy management device 10 may also be connected to a terminal device of the user, for example, communicatively connected to a cellular phone of the user. The cellular phone of the user, after installing a corresponding application, may receive information transmitted from the energy management device 10, including information such as a power consumption time of the loads 18 with different priority and a number and names of loads 18 that are currently in the power-on state. The terminal device includes, but is not limited to, a smartphone, a tablet, a wearable smart device, etc.

In one embodiment, the energy management device 10 may perform power usage planning for next 24 hours. First, the energy management device 10 may predict an electricity consumption price and an on-grid electricity price for the next 24 hours based on the historical electricity consumption price and the historical on-grid electricity price. At the same time, due to a high correlation between electricity consumption demand and an electricity consumption time period of the non-time-shifting load, consumed electric power of the non-time-shifting load within the next 24 hours may be predicted more accurately. Therefore, a power consumption time period of the time-shifting load can be planned based on the electricity consumption price and the on-grid electricity price for the next 24 hours, and the consumed electric power of the non-time-shifting load, and the power consumption planning can be sent to the terminal device of the user.

In some embodiments, the energy management device 10 includes a first energy management device and a second energy management device. The second energy management device is configured to send a detection signal to the first energy management device and receive a response signal returned from the first energy management device. The second energy management device is configured to take over the first energy management device in response to the second energy management device not receiving the response signal.

In this way, providing a backup energy management device may allow the home energy system 100 more stable.

In an exemplary embodiment of the present disclosure, if the second energy management device sends a detection signal to the first energy management device but does not receive a response signal returned from the first energy management device, the second energy management device may determine that the first energy management device is abnormal (e.g., breakdown, etc.). Therefore, the second energy management device may take over operation of the first energy management device. That is, in this case, the second energy management device may obtain the consumed electric power of the load 18 and the generated electric power of the non-time-shifting power generation device, and implement the control method for the home energy system 100 described in any one of the above embodiments. Thus, a situation of the power distribution system not functioning can be prevented during the abnormality of the first energy management device. As a result, stability of the home energy system 100 is improved.

In other embodiments, the first energy management device and the second energy management device may perform mutual detection to determine whether it is normal for each other' operation. For example, one of the first energy management device and the second energy management device sends a detection signal to the other and receives a response signal returned from the other, and the response signal is used to determine whether the other of the first energy management device and the second energy management device is abnormal.

In some embodiments, the power distribution device 14 includes at least one of a smart socket, a smart plug, or a smart air switch.

In this way, the energy management device 10 may obtain the consumed electric power of each load 18 and the generated electric power of each non-time-shifting power generation device, and fine-tune the management.

In an exemplary embodiment of the present disclosure, the power distribution device 14 is connected to the energy storage device 12, the power generation device 16, the plurality of loads 18, and the public power grid 20, and the power distribution device 14 is configured to control the power-on state and power-off state of the load 18 and further configured to control the home energy system 100 to be powered by one or more of the energy storage device 12, the power generation device 16, and the public power grid 20. The power distribution device 14 includes a smart socket, a smart plug, and a smart air switch, or other power distribution devices 14 has a control module and a communication module internally and capable of controlling a device connected thereto. The power distribution device 14 has a communication function and may read data such as a voltage, a current, and a temperature of the load 18, the energy storage device 12, and the power generation device 16 that are connected to the power distribution device 14, the consumed electric power of the load 18 as well as the generated electric power of the power generation device 16, and send the data to a higher-level management system for management. Therefore, the energy management device 10 may fine-tune the management of the load 18 and the non-time-shifting power generation device in the home energy system 100.

Referring to FIG. 3, an energy management device 10 of an embodiment of the present disclosure includes a first processor 28 and a first memory 30 storing a computer program. The computer program, when executed by the first processor 28, implements the steps of the control method for the home energy system as described in any one of the above embodiments.

A power distribution device 14 of an embodiment of the present disclosure is configured for communication connection with the energy management device 10.

Figure 13:
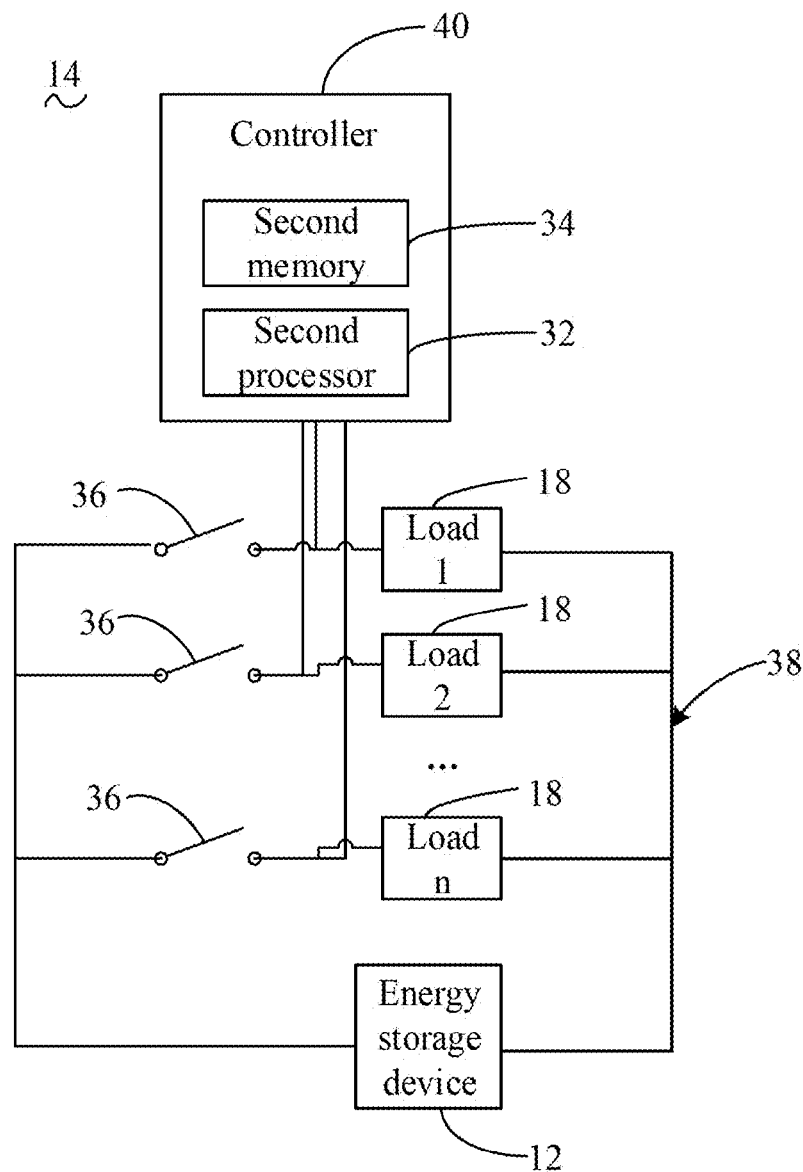
FIG. 13 is a schematic diagram of a power supply circuit for a power distribution device according to an embodiment of the present disclosure.

In one embodiment, the power distribution device 14 includes a controller 40, a power supply circuit 38, and a plurality of switches 36. The power distribution device 14 is electrically connected to the energy storage device 12, the non-time-shifting power generator, and the plurality of loads 18. The controller 40 is electrically connected to the plurality of switches 36. The plurality of switches 36 and the plurality of loads 18 are connected to the power supply circuit 38. Each of the switches 36 controls a power-on state and a power-off state of a corresponding one of the plurality of loads 18. The controller is configured to receive control instructions set by the energy management device 10 and control a corresponding switch 36 based on the control instructions to control a power-on state and a power-off state of a corresponding load 18. The controller 40 includes a second processor 32 and a second memory 34. In this case, the power distribution device 14 is powered by the energy storage device 12, and a circuit is schematically shown in FIG. 13.

When the power distribution device 14 is connected to the energy storage device 12 and the non-time-shifting power generation device, the power distribution device 14 may obtain information such as power supply power of the energy storage device 12 and the generated electric power of the non-time-shifting power generation device and send the information to the controller. At the same time, the power distribution device 14 may receive instructions from the controller to control the home energy system to be powered by the energy storage device 12 or the non-time-shifting power generation device. The power distribution device 14 may also control the non-time-shifting power generation device to charge the energy storage device 12 based on the instructions of the controller.

In one embodiment, the controller may be controlled by the energy management device 10 connected to the home energy system 100 to receive the control instructions sent by the energy management device 10 and to control the corresponding switch to control the power-on state and the power-off state of the corresponding load 18 based on the control instructions.

In one embodiment, the controller may individually perform the steps of the above-described control method for the home energy system 100 to control the power supply and usage of the home energy system 100.

According to embodiments of the present disclosure, there is provided a computer-readable storage medium. The computer-readable storage medium has a computer program stored thereon. The computer program, when executed by a processor, implements the steps of the control method for the home energy system as described in any one of the above embodiments.

In an exemplary embodiment of the present disclosure, the processor may be a first processor 28 of the energy management device 10 or a processor of another device or apparatus.

The home energy system 100, the energy management device 10, the power distribution device 14, and the computer-readable storage medium as above described may control, based on a power supply state of the energy storage device 12 and the priority of the load 18, the power-on state and the power-off state of the load 18 connected to the power distribution device 14 when the power distribution device 14 is powered by different power sources. Therefore, each load 18 in a home power grid is controlled, which thus helps the user to fine-tune the management of the load 18.

It should be noted that the above explanatory description of the implementation and beneficial effects of the control method for the home energy system apply mutatis mutandis to the home energy system 100, the energy management device 10, the power distribution device 14, and the computer-readable storage medium of the embodiments of the present disclosure, and are not detailed herein to avoid redundancy.

In one embodiment, the steps of the control method for the home energy system implemented when the computer program executed by the processor include the following actions.

Step S101, when the home energy system 100 is in a grid-connected state and the non-time-shifting power generation device is in a power-supply state, obtaining consumed electric power of the plurality of loads 18 and predicted generated electric power of the non-time-shifting power generation device during each electricity consumption time period of a current day.

Step S103, when net power of the home energy system 100 during each electricity consumption time period of the current day is greater than zero, controlling, based on an electricity price of a public power grid 20 during each electricity consumption time period of the current day, the home energy system 100 to be powered by the energy storage device 12 or powered by the public power grid 20 to enable an electricity bill to meet a predetermined condition, the net power of the home energy system 100 during each electricity consumption time period of the current day being a difference between the predicted generated electric power and the predicted consumed electric power.

Step S105, when the net power of the home energy system 100 during each electricity consumption time period of the current day is smaller than zero, controlling, based on the electricity price during each electricity consumption time period of the current day, the non-time-shifting power generation device to output electric energy to the energy storage device 12 or the public power grid 20 to enable the electricity bill to meet the predetermined condition.

It should be understood that the computer program may include computer program codes. The computer program codes may be in a form of source codes, object codes, an executable file, or some intermediate forms, etc. The computer-readable storage medium may include any entity or device capable of carrying a computer program, a recording medium, a Universal Serial Bus (USB) flash drive, a removable hard disk, a diskette, an optical disk, a computer memory, a Read-Only Memory (ROM), a Random Access Memory (RAM), a software distribution medium, etc. The processor may be a Central Processing Unit (CPU), another general-purpose processor, a Digital Signal Processor (DSP), an Application Specific Integrated Circuit (ASIC), a Field-Programmable Gate Array (FPGA) or other programmable logic device, a discrete gate or a transistor logic device, a discrete hardware component, etc.

In the description of this specification, descriptions with reference to the terms "an embodiment", "some embodiments", "illustrative embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

From the above description of the implementations, it will be clear to those skilled in the art that the method of the above embodiments can be implemented with the aid of software and a necessary common hardware platform or can be implemented through hardware. In many cases, the former one is a better implementation. Based on this understanding, all or part of the technical solutions according to the embodiments of the present disclosure, or the part thereof that contributes to the related art, may be embodied in the form of a software product. The computer software product may be stored in a storage medium (such as a Read Only Memory (ROM)/Random Access Memory (RAM), a disk, and an optical disk) and contain instructions to enable a terminal device (which may be a mobile phone, a computer, a server, a heat recovery multi-split air conditioner, a network device, etc.) to perform the method described in each of the embodiments of the present disclosure.

Although embodiments of present disclosure have been shown and described above, it should be understood that above embodiments are just explanatory, and cannot be construed to limit the present disclosure, for those skilled in the art, changes, alternatives, and modifications may be made to the embodiments without departing from spirit, principles and scope of the present disclosure.

What is claimed is:

1. A control method for a home energy system, the home energy system comprising a power distribution device connected to a plurality of loads, a non-time-shifting power generation device, and an energy storage device, the control method for the home energy system comprising:
    when the home energy system is in a grid-connected state and the non-time-shifting power generation device is in a power-supply state, obtaining consumed electric power of the plurality of loads and generated electric power of the non-time-shifting power generation device during each electricity consumption time period of a current day;
    when net power of the home energy system during each electricity consumption time period of the current day is greater than zero, controlling, based on an electricity price of a public power grid during each electricity consumption time period of the current day, the home energy system to be powered by the energy storage device or powered by the public power grid to enable an electricity bill to meet a predetermined condition, the net power of the home energy system during each electricity consumption time period of the current day being a difference between the generated electric power and the consumed electric power; and
    when the net power of the home energy system during each electricity consumption time period of the current day is smaller than zero, controlling, based on the electricity price of the public power grid during each electricity consumption time period of the current day, the non-time-shifting power generation device to output electric energy to the energy storage device or the public power grid to enable the electricity bill to meet the predetermined condition.

2. The control method for the home energy system according to claim 1, wherein:
    the electricity price of the public power grid during each electricity consumption time period of the current day comprises an electricity consumption price and an on-grid electricity price; and
    said controlling, based on the electricity price of the public power grid during each electricity consumption time period of the current day, the home energy system to be powered by the energy storage device or powered by the public power grid to enable the electricity bill to meet the predetermined condition comprises:
        controlling the home energy system to be powered by the energy storage device during an electricity consumption time period when the electricity consumption price is greater than the on-grid electricity price; and controlling the home energy system to be powered by the public power grid during an electricity consumption time period when the electricity consumption price is smaller than the on-grid electricity price.

3. The control method for the home energy system according to claim 1, wherein:
the electricity price during each electricity consumption time period of the current day comprises an on-grid electricity price; and
said controlling, based on the electricity price during each electricity consumption time period of the current day, the non-time-shifting power generation device to output electric energy to the energy storage device or the public power grid to enable the electricity bill to meet the predetermined condition comprises:
when the net power of the home energy system during each electricity consumption time period of the current day is smaller than zero, controlling the non-time-shifting power generation device to output the electric energy to the energy storage device; and
controlling the energy storage device to output electric energy to the public power grid during an electricity consumption time period when an on-grid electricity price is greater than a predetermined on-grid electricity price.

4. The control method for the home energy system according to claim 1, wherein:
the power distribution device is configured to detect the consumed electric power of the plurality of loads and the generated electric power of the non-time-shifting power generation device; and
said obtaining the consumed electric power of the plurality of loads and the generated electric power of the non-time-shifting power generation device during each electricity consumption time period of the current day comprises:
obtaining consumed electric power of the plurality of loads and generated electric power of the non-time-shifting power generation device that are detected by the power distribution device during each time period of each day, and recording the consumed electric power of the plurality of loads and the generated electric power of the non-time-shifting power generation device that are detected by the power distribution device during each time period of each day as historical consumed electric power of the plurality of loads during each time period of each day and historical generated electric power of the non-time-shifting power generation device during each time period of each day, respectively; and
obtaining the consumed electric power and the generated electric power during each electricity consumption time period of the current day based on the historical consumed electric power and the historical generated electric power.

5. The control method for the home energy system according to claim 1, wherein:
each of the plurality of loads is divided into a first load or a second load, the first load having a higher power-on priority than the second load when the home energy system is in the grid-connected state;
the electricity price of the public power grid during each electricity consumption time period of the current day comprises an electricity consumption price; and
the control method for the home energy system comprises:
when the home energy system is in the grid-connected state, based on the electricity consumption price, controlling the power distribution device to enable the first load to be in a power-on state during each electricity consumption time period, and controlling the second load to be in a power-on state during an electricity consumption time period when the electricity consumption price is smaller than a first predetermined value, and controlling the second load to be in a power-off state during an electricity consumption time period when the electricity consumption price is greater than the first predetermined value.

6. The control method for the home energy system according to claim 1, wherein:
each of the plurality of loads is configured with an importance level, a load of a high importance level having a higher power-on priority than a load of a low importance level; and
the control method comprises:
when the home energy system is in an off-grid state and the energy storage device is in the power-supply state, controlling the power distribution device to be powered by the energy storage device, and controlling a power-on state and a power-off state of each of the plurality of loads based on an importance level of each of the plurality of loads.

7. The control method for the home energy system according to claim 6, wherein when the home energy system is in the off-grid state and the energy storage device is in the power-supply state, said controlling the power distribution device to be powered by the energy storage device, and said controlling the power-on state and the power-off state of each of the plurality of loads based on the importance level of each of the plurality of loads comprise:
obtaining remaining power of the energy storage device; and
based on the remaining power of the energy storage device and the importance level of each of the plurality of loads, controlling the power distribution device to switch loads in the power-on state among the plurality of loads to the power-off state in an ascending order of the importance level, wherein the smaller the remaining power is, the smaller the number of loads in the power-on state among the plurality of loads is.

8. The control method of the home energy system according to claim 6, wherein when the home energy system is in the off-grid state and the energy storage device is in the power-supply state, said controlling the power distribution device to be powered by the energy storage device, and said controlling the power-on state and the power-off state of each of the plurality of loads based on the importance level of each of the plurality of loads comprise:
obtaining remaining power of the energy storage device and a required operating duration of a load whose importance level is higher than a predetermined level;
obtaining, based on the required operating duration, operating power required to maintain the load whose importance level is higher than the predetermined level for the required operating duration; and
when the remaining power is smaller than the operating power, controlling the load whose importance level is higher than the predetermined level to be in the power-on state and other loads to be in the power-off state.

9. The control method for the home energy system according to claim 6, wherein when the home energy system is in the off-grid state and the energy storage device is in the power-supply state, said controlling the power distribution device to be powered by the energy storage device, and said controlling the power-on state and the power-off state of each of the plurality of loads based on the importance level of each of the plurality of loads comprise:

obtaining total consumed electric power of all loads in the power-on state on the power distribution device; and when the total consumed electric power is greater than predetermined power, controlling the power distribution device to sequentially switch the plurality of loads in the power-on state to the power-off state in an ascending order of the importance level until the total consumed electric power is smaller than or equal to the predetermined power.

10. The control method for the home energy system according to claim 6, wherein the importance level of each of the plurality of loads is set by the home energy system by default and/or set by an input instruction of a user.

11. An energy management device, comprising:
a first processor; and
a first memory storing a computer program, wherein the computer program, when executed by the first processor, implements the steps of the control method for the home energy system according to claim 1.

12. The energy management device according to claim 11, wherein:

the electricity price of the public power grid during each electricity consumption time period of the current day comprises an electricity consumption price and an on-grid electricity price; and said controlling, based on the electricity price of the public power grid during each electricity consumption time period of the current day, the home energy system to be powered by the energy storage device or powered by the public power grid to enable the electricity bill to meet the predetermined condition comprises:

controlling the home energy system to be powered by the energy storage device during an electricity consumption time period when the electricity consumption price is greater than the on-grid electricity price; and controlling the home energy system to be powered by the public power grid during an electricity consumption time period when the electricity consumption price is smaller than the on-grid electricity price.

13. The energy management device according to claim 11, wherein:

the electricity price during each electricity consumption time period of the current day comprises an on-grid electricity price; and said controlling, based on the electricity price during each electricity consumption time period of the current day, the non-time-shifting power generation device to output electric energy to the energy storage device or the public power grid to enable the electricity bill to meet the predetermined condition comprises:

when the net power of the home energy system during each electricity consumption time period of the current day is smaller than zero, controlling the non-time-shifting power generation device to output the electric energy to the energy storage device; and controlling the energy storage device to output electric energy to the public power grid during an electricity consumption time period when an on-grid electricity price is greater than a predetermined on-grid electricity price.

14. The energy management device according to claim 11, wherein:

the power distribution device is configured to detect the consumed electric power of the plurality of loads and the generated electric power of the non-time-shifting power generation device; and said obtaining the consumed electric power of the plurality of loads and the generated electric power of the non-time-shifting power generation device during each electricity consumption time period of the current day comprises:

obtaining consumed electric power of the plurality of loads and generated electric power of the non-time-shifting power generation device that are detected by the power distribution device during each time period of each day, and recording the consumed electric power of the plurality of loads and the generated electric power of the non-time-shifting power generation device that are detected by the power distribution device during each time period of each day as historical consumed electric power of the plurality of loads during each time period of each day and historical generated electric power of the non-time-shifting power generation device during each time period of each day, respectively; and obtaining the consumed electric power and the generated electric power during each electricity consumption time period of the current day based on the historical consumed electric power and the historical generated electric power.

15. The energy management device according to claim 11, wherein:

each of the plurality of loads is divided into a first load or a second load, the first load having a higher power-on priority than the second load when the home energy system is in the grid-connected state;

the electricity price of the public power grid during each electricity consumption time period of the current day comprises an electricity consumption price; and the control method for the home energy system comprises:

when the home energy system is in the grid-connected state, based on the electricity consumption price, controlling the power distribution device to enable the first load to be in a power-on state during each electricity consumption time period, and controlling the second load to be in a power-on state during an electricity consumption time period when the electricity consumption price is smaller than a first predetermined value, and controlling the second load to be in a power-off state during an electricity consumption time period when the electricity consumption price is greater than the first predetermined value.

16. The energy management device according to claim 11, wherein:

each of the plurality of loads is configured with an importance level, a load of a high importance level having a higher power-on priority than a load of a low importance level; and the control method comprises:

when the home energy system is in an off-grid state and the energy storage device is in the power-supply state, controlling the power distribution device to be powered by the energy storage device, and controlling a power-on state and a power-off state of each of the plurality of loads based on an importance level of each of the plurality of loads.

17. The energy management device according to claim 16, wherein when the home energy system is in the off-grid state and the energy storage device is in the power-supply state, said controlling the power distribution device to be powered by the energy storage device, and said controlling the power-on state and the power-off state of each of the plurality of loads based on the importance level of each of the plurality of loads comprise:

obtaining remaining power of the energy storage device; and based on the remaining power of the energy storage device and the importance level of each of the plurality of loads, controlling the power distribution device to switch loads in the power-on state among the plurality of loads to the power-off state in an ascending order of the importance level, wherein the smaller the remaining power is, the smaller the number of loads in the power-on state among the plurality of loads is.

18. A home energy system, comprising the energy management device according to claim 11, the energy storage device, the power distribution device, and the non-time-shifting power generation device, wherein:

the energy management device is electrically connected to the power distribution device, the non-time-shifting power generation device, and the energy storage device, and the power distribution device is connected to a plurality of loads.

19. The home energy system according to claim 18, wherein the power distribution device comprises at least one of a smart socket, a smart plug, or a smart air switch.

20. A non-transitory computer-readable storage medium, having a computer program stored thereon, wherein the computer program, when executed by a processor, implements the steps of the control method for the home energy system according to claim 1.

* * * * *